United States Patent
Suzuki

(10) Patent No.: US 8,208,899 B2
(45) Date of Patent: Jun. 26, 2012

(54) WIRELESS COMMUNICATION SYSTEM, WIRELESS COMMUNICATION DEVICE, AUTHENTICATION METHOD OF WIRELESS COMMUNICATION DEVICE, AND PROGRAM

(75) Inventor: Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 850 days.

(21) Appl. No.: 11/855,015

(22) Filed: Sep. 13, 2007

(65) Prior Publication Data

US 2008/0132206 A1   Jun. 5, 2008

(30) Foreign Application Priority Data

Sep. 14, 2006 (JP) ................. 2006-250131
Jul. 30, 2007 (JP) ................. 2007-196837

(51) Int. Cl.
*H04M 1/66* (2006.01)
*G06F 15/16* (2006.01)

(52) U.S. Cl. .............. 455/411; 709/234; 709/238

(58) Field of Classification Search .......... 455/411, 455/410, 41.1, 39; 709/234, 238
See application file for complete search history.

(56) References Cited

U.S. PATENT DOCUMENTS

| | | | |
|---|---|---|---|
| 6,961,575 | B2 | 11/2005 | Stanforth |
| 2003/0037033 | A1* | 2/2003 | Nyman et al. ............ 707/1 |
| 2003/0105956 | A1* | 6/2003 | Ishiguro et al. .......... 713/158 |
| 2004/0117156 | A1* | 6/2004 | Newman et al. ......... 702/187 |
| 2004/0198220 | A1* | 10/2004 | Whelan et al. .......... 455/41.1 |
| 2004/0215815 | A1* | 10/2004 | Rekimoto ............... 709/236 |
| 2004/0240411 | A1 | 12/2004 | Suzuki |
| 2004/0253943 | A1 | 12/2004 | Suzuki et al. |
| 2004/0259529 | A1 | 12/2004 | Suzuki |
| 2005/0003814 | A1 | 1/2005 | Saito et al. |
| 2005/0027984 | A1* | 2/2005 | Saito et al. ............ 713/168 |
| 2005/0123141 | A1 | 6/2005 | Suzuki |
| 2005/0159134 | A1 | 7/2005 | Suzuki |
| 2006/0094456 | A1* | 5/2006 | Rittle et al. ............ 455/519 |

FOREIGN PATENT DOCUMENTS

| | | |
|---|---|---|
| CN | 1577410 A | 2/2005 |
| JP | 2003-309558 | 10/2003 |
| JP | 2004-328093 | 11/2004 |
| JP | 2005-065247 | 3/2005 |

(Continued)

OTHER PUBLICATIONS

Notification of First Office Action from the Chinese Patent Office for Application No. 200710151508.1 issued Jun. 4, 2010.

(Continued)

*Primary Examiner* — Jinsong Hu
*Assistant Examiner* — Opiribo Georgewill
(74) *Attorney, Agent, or Firm* — Finnegan, Henderson, Farabow, Garrett & Dunner, L.L.P.

(57) ABSTRACT

There is provided a wireless communication system in which a plurality of wireless communication devices form a network in an autonomous distributed manner. Each of the plurality of wireless communication devices includes an identification information acquirer that acquires, from another wireless communication device that satisfies a predetermined condition, the identification information of the another communication device, an identification information holder that holds the acquired identification information of the another wireless communication device, and an authentication unit that, in authentication of the another wireless communication device, continues the authentication on condition that identification information in a certificate of the another wireless communication device is held in the identification information holder.

6 Claims, 14 Drawing Sheets

FOREIGN PATENT DOCUMENTS

| | | |
|---|---|---|
| JP | 2005-223899 | 8/2005 |
| JP | 2005-236951 | 9/2005 |
| JP | 2006-229265 | 8/2006 |
| WO | WO 0239655 A1 * | 5/2002 |
| WO | WO 04/001242 A1 | 12/2003 |

OTHER PUBLICATIONS

B. Aboba et al., "PPP EAP TLS Authentication Protocol", RFC 2716, Network Working Group, IETF (htt://www.ietf.org/rfc/rfc2716.txt), Oct. 1999.

* cited by examiner

FIG.3

| IDENTIFICATION INFORMATION | AUTHENTICATION POSSIBILITY |
|---|---|
| DSC-T9_002 | AUTHENTICATION IS POSSIBLE |
| DSC-T9_003 | AUTHENTICATION IS POSSIBLE |
| DSC-T9_004 | AUTHENTICATION IS REJECTED |
| ⋮ | ⋮ |

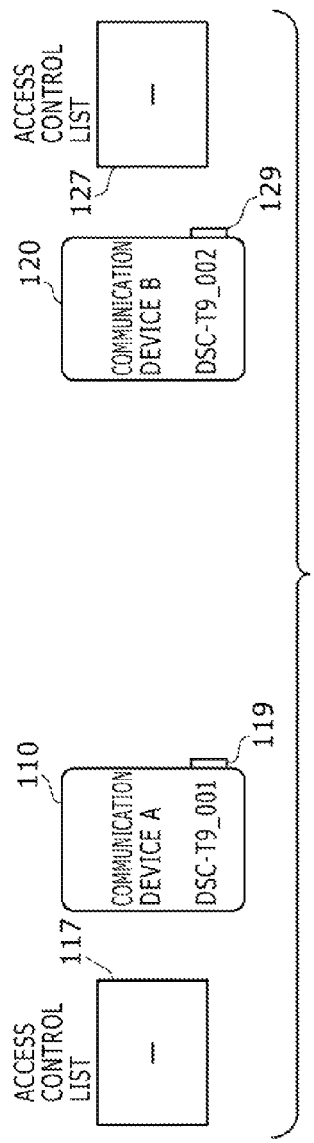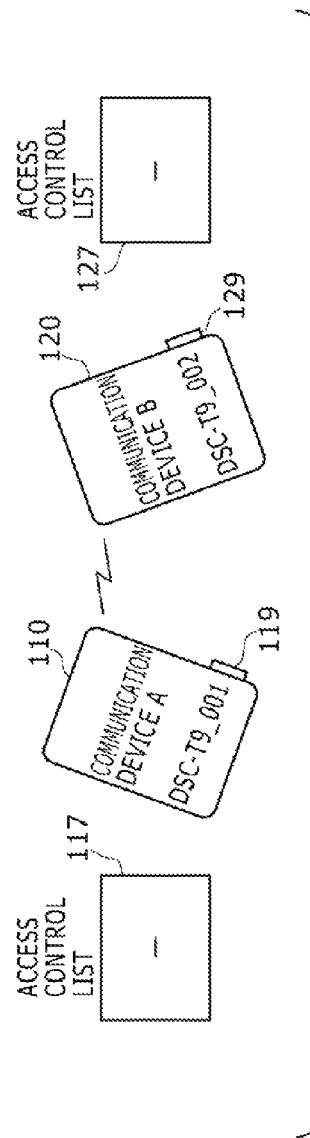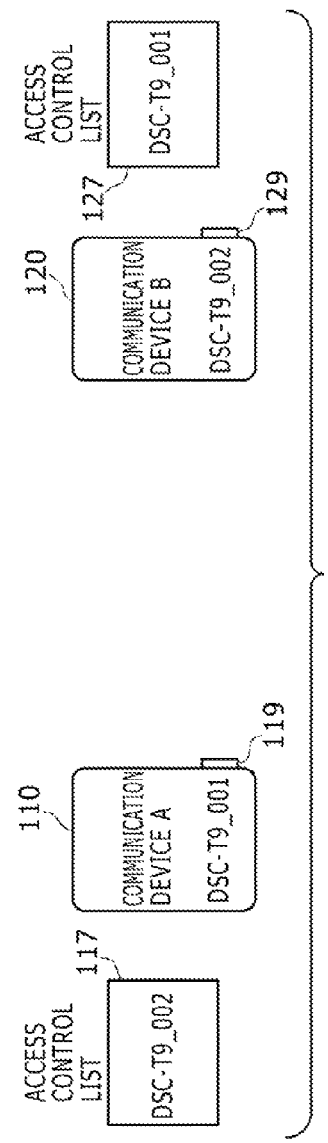

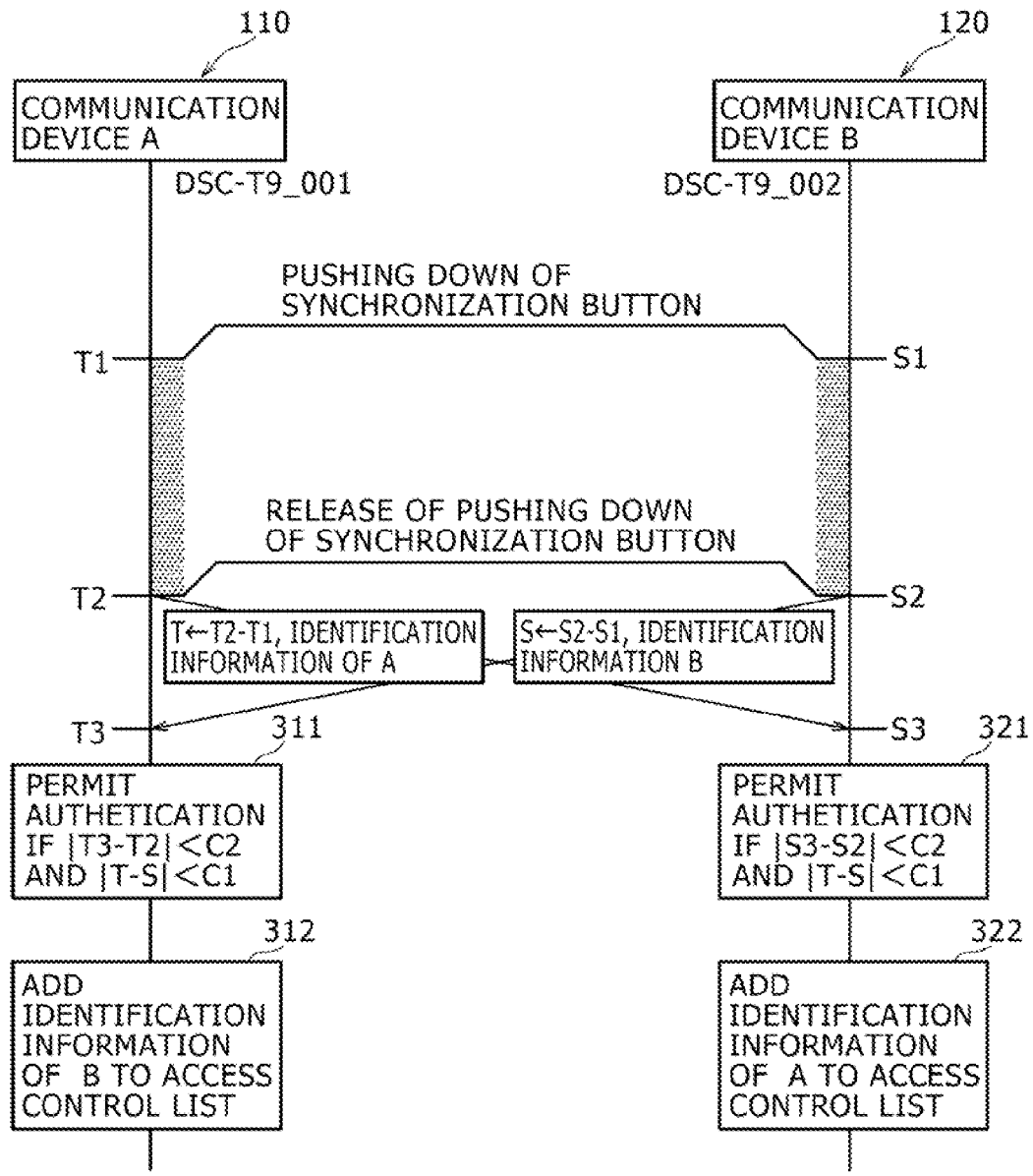

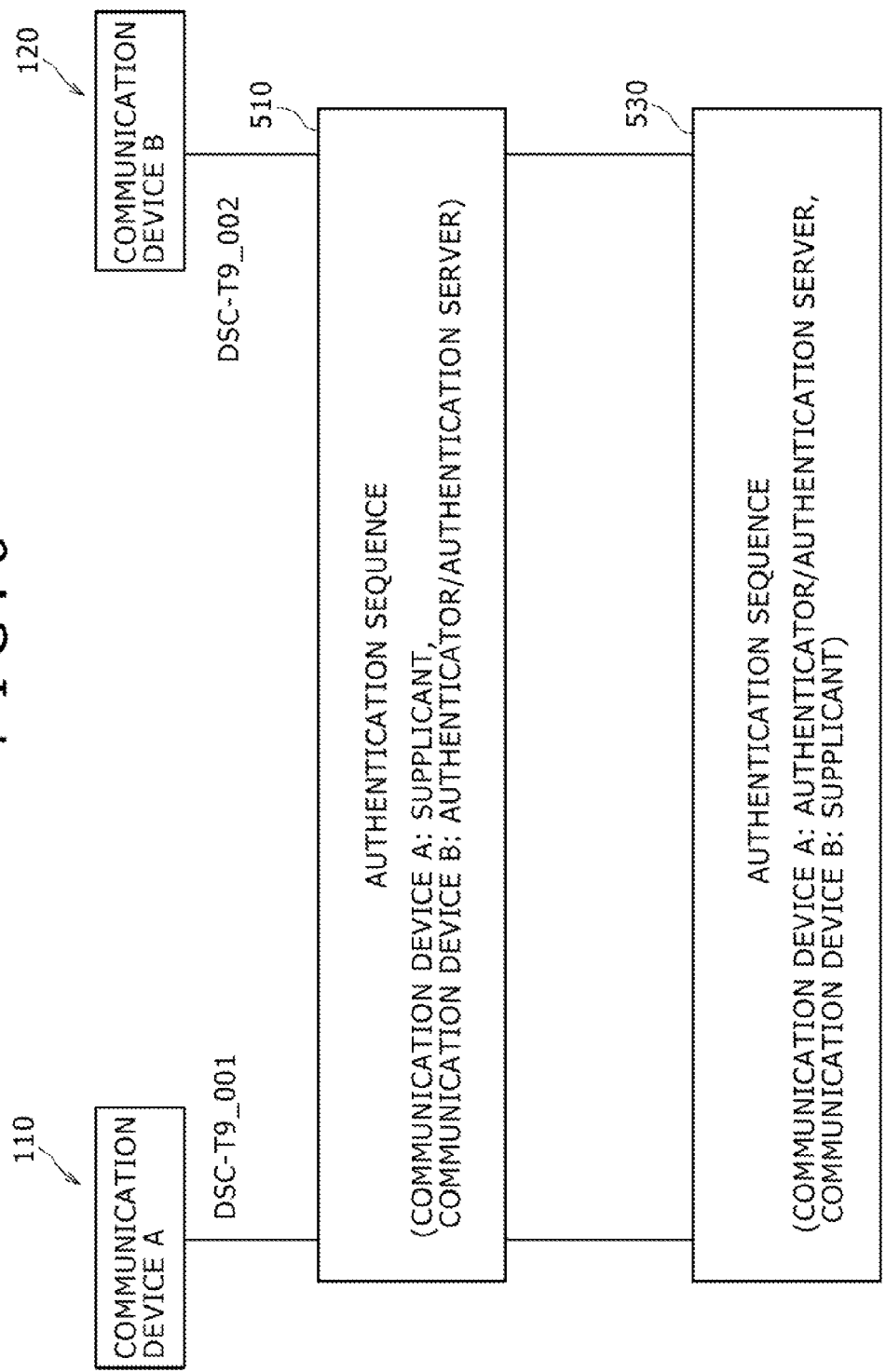

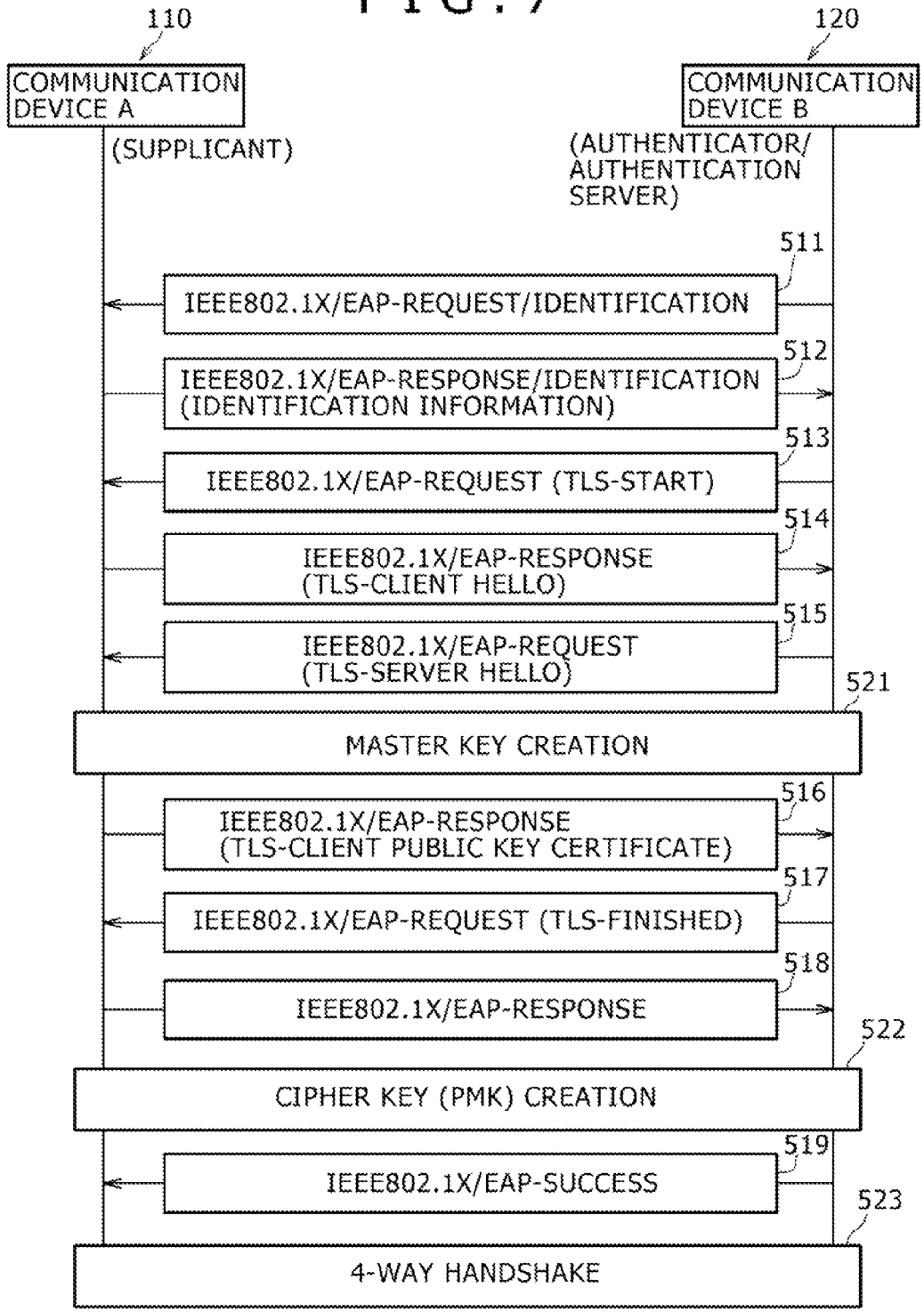

FIG.11

| NAME | TELEPHONE NUMBER | AUTHENTICATION POSSIBILITY |
|---|---|---|
| Bob | 090-xxxx-bbbb | AUTHENTICATION IS POSSIBILE |
| Carol | 090-yyyy-cccc | AUTHENTICATION IS POSSIBILE |
| Debby | 090-zzzz-dddd | AUTHENTICATION IS REJECTED |
| ⋮ | ⋮ | ⋮ |

WIRELESS COMMUNICATION SYSTEM, WIRELESS COMMUNICATION DEVICE, AUTHENTICATION METHOD OF WIRELESS COMMUNICATION DEVICE, AND PROGRAM

CROSS REFERENCES TO RELATED APPLICATIONS

The present invention contains subject matter related to Japanese Patent Application JP 2006-250131 filed in the Japan Patent Office on Sep. 14, 2006, and Japanese Patent Application JP 2007-196837 filed in the Japan Patent Office on Jul. 30, 2007, the entire contents of which being incorporated herein by reference.

BACKGROUND OF THE INVENTION

1. Field of the Invention

The present invention relates a wireless communication system, and particularly to a wireless communication system including plural wireless communication devices that form a network in an autonomous distributed manner, a wireless communication device, a processing method of the system and device, and a program that causes a computer to execute the method.

2. Description of the Related Art

As a mode for constructing a network by using a wireless technique, an infrastructure wireless local area network (LAN) system is defined in the Institute of Electrical and Electronics Engineers (IEEE) 802.11i. In this infrastructure wireless LAN system, a network is formed under overall control by wireless communication devices called an access point (AP) or the like.

In the IEEE 802.11i, an independent basic service set (IBSS) wireless LAN system is defined besides the infrastructure wireless LAN system. In this IBSS wireless LAN system, the overall control by specific access points is not carried out, but a network is formed through direct asynchronous wireless communication in an autonomous distributed manner between any optional wireless communication devices that operate as wireless terminals.

Also in a mesh wireless LAN system proposed in the IEEE 802.11s, a network is formed through direct asynchronous wireless communication in an autonomous distributed manner between wireless communication devices. In this mesh wireless LAN system, multi-hop communication to a wireless communication device that is out of the range permitting the direct arrival of electric waves is achieved via other wireless communication devices. Hereinafter, the IBSS wireless LAN system and the mesh wireless LAN system will be referred to collectively as an autonomous distributed wireless LAN system.

In either the infrastructure wireless LAN system or the autonomous distributed wireless LAN system, there has been proposed an authentication scheme employing an authentication server (AS) of the IEEE 802.1X as a scheme for enhancing security functions. In the infrastructure wireless LAN system, authentication information of all wireless terminals is centrally managed by an authentication server, and an access point serves as an authentication proxy to the authentication server and handles the sequence of the authentication protocol between a wireless terminal and the authentication server, for example. That is, in this system, the role of each terminal can be determined expressly. The entity that operates as an authentication proxy to the authentication server for other wireless terminals is referred to as an authenticator. The entity that is subjected to authentication processing via the authenticator is referred to as a supplicant. On the other hand, in the autonomous distributed wireless LAN system, the roles of individual wireless terminals are not defined expressly. Therefore, any wireless terminal serves as an authenticator/authentication server, while another wireless terminal serves as a supplicant.

However, in these IEEE 802.11i and 802.11s, a specific authentication protocol is not defined although use of the IEEE 802.1X is contemplated. To address this, in the internet engineering task force (IETF), the extensible authentication protocol (EAP) is employed as an authentication protocol ranked higher than the IEEE 802.1X, to thereby provide flexibility and extensibility.

The EAP can realize a specific authentication scheme by being combined with an encryption protocol. The following description will deal with the case in which the transport layer security (TLS) is used as the encryption protocol. The authentication based on the EAP employing the TLS as an encryption protocol is referred to as the EAP-TLS authentication. In this EAP-TLS authentication, authentication by use of an electronic certificate (public key certificate) is performed between an authentication server and a client. Although it is necessary that a certification authority (CA) issue in advance a public key certificate to the authentication server and the respective terminals, the EAP-TLS authentication is a system that does not rely on a password and the like, and is known for its very high safety (refer to e.g. B. Aboba and D. Simon: "PPP EAP TLS Authentication Protocol", RFC 2716, Network Working Group, IETF (http://www.ietf.org/rfc/rfc2716.txt, which is referred as Non-Patent Document 1).

However, in the EAP-TLS authentication, connection from an entity having a public key certificate is all permitted as long as the public key certificate is issued from a certification authority reliable to the authentication server. That is, this scheme does not have a system for permitting authentication only for specific entities.

To realize permission only for specific entities, any authentication information needs to be managed. However, such management leads to complexity in general. In the autonomous dispersed wireless LAN system in particular, wireless terminals possibly move, and hence the terminals constructing a network are different from time to time. Therefore, a communication path for such management is not necessarily always ensured. That is, in order to control authentication subjects in the autonomous dispersed wireless LAN system, authentication information of wireless terminals need to be efficiently dispersed and managed.

SUMMARY OF THE INVENTION

There is a need for the present invention to control authentication subjects in an autonomous dispersed wireless LAN system to thereby form a secure network.

According to a first embodiment of the present invention, there is provided a wireless communication system in which a plurality of wireless communication devices form a network in an autonomous distributed manner. Each of the plurality of wireless communication devices includes an identification information acquirer configured to acquire, from another wireless communication device that satisfies a predetermined condition, the identification information of the another communication device, an identification information holder configured to hold the acquired identification information of the another wireless communication device, and an authentication unit configured to, in authentication of the another wireless communication device, continue the authentication on condition that identification information in a certificate of the another wireless communication device is held in the identification information holder. This causes an advantage that a secure network is formed by continuing authentication processing only for a wireless communication device of which identification information has been acquired in advance.

According to a second embodiment of the present invention, there is provided a wireless communication device in a wireless communication system in which a plurality of wireless communication devices form a network in an autonomous distributed manner. The device includes an identification information acquirer configured to acquire, from another wireless communication device that satisfies a predetermined condition, the identification information of the another communication device, an identification information holder configured to hold the acquired identification information of the another wireless communication device, and an authentication unit configured to, in authentication of the another wireless communication device, continue the authentication on condition that identification information in a certificate of the another wireless communication device is held in the identification information holder. This causes an advantage that a secure network is formed by continuing authentication processing only for a wireless communication device of which identification information has been acquired in advance.

The embodiments of the present invention can offer an excellent advantageous effect that a secure network can be formed in an autonomous dispersed wireless LAN system.

BRIEF DESCRIPTION OF THE DRAWINGS

FIG. 3 is a diagram showing one configuration example of an access control list in the first embodiment of the present invention;

FIGS. 4A to 4C are diagrams showing registration of the identification information of communication devices in a wireless communication system in the first embodiment of the present invention;

FIG. 5 is a diagram showing a procedure example of registration of the identification information of communication devices in a wireless communication system in the first embodiment of the present invention;

FIG. 6 is a diagram showing a procedure example of mutual authentication between communication devices in an IBSS wireless LAN system in the first embodiment of the present invention;

FIG. 7 is a diagram showing a procedure example of an authentication sequence in an IBSS wireless LAN system in the first embodiment of the present invention;

FIG. 11 is a diagram showing one configuration example of a telephone directory in the modification example of the first embodiment of the present invention;

DETAILED DESCRIPTION OF THE PREFERRED EMBODIMENTS (1) First Embodiment

A first embodiment of the present invention will be described in detail below with reference to the accompanying drawings.

Figure 1:
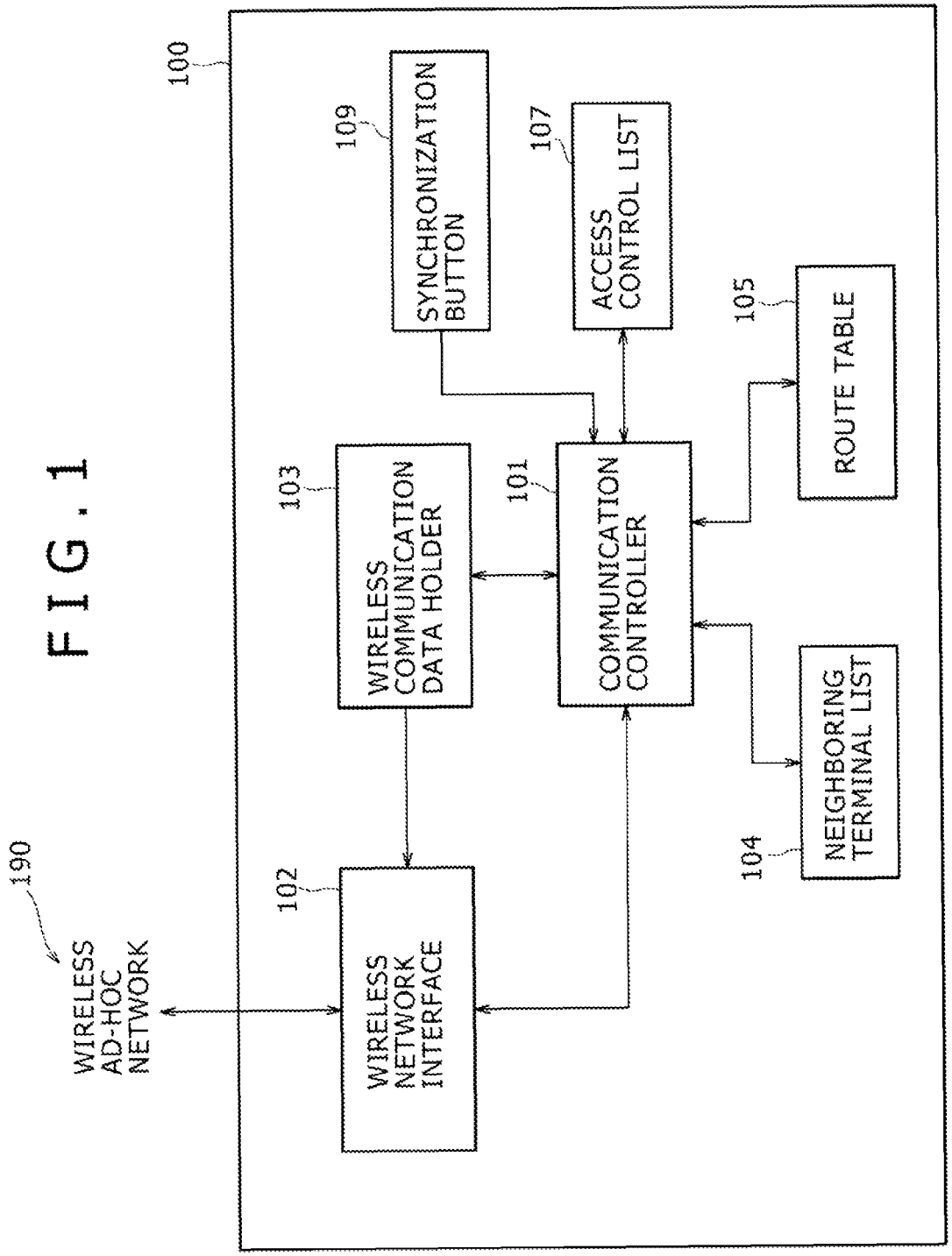
FIG. 1 is a diagram showing one configuration example of a communication device in a first embodiment of the present invention.

FIG. 1 is a diagram showing one configuration example of a communication device 100 in the first embodiment of the present invention. This communication device 100 includes a communication controller 101, a wireless network interface 102, a wireless communication data holder 103, a neighboring terminal list 104, a route table 105, an access control list 107, and a synchronization button 109. The communication device 100 communicates with another communication device via a wireless ad-hoc network 190.

The communication controller 101 controls the whole of the communication device 100. Authentication processing with another communication device is also executed by the communication controller 101.

The wireless network interface 102 is used for communication with the wireless ad-hoc network 190.

The wireless communication data holder 103 holds setting data for wireless communication. Held as the setting data are e.g. a service set identifier (SSID) for identification of the wireless ad-hoc network 190, security setting data such as a cipher and public key certificate used for a robust security network (RSN), the MAC address of the communication device 100, and the device name of the communication device 100.

The neighboring terminal list 104 includes a list of communication devices (neighboring terminals) that exist near the communication device 100 in the wireless ad-hoc network 190. The communication controller 101 receives beacons cyclically transmitted from other communication devices, to thereby implement control so that the latest status can be reflected in the neighboring terminal list 104.

The route table 105 includes a list of routes for arrival to other communication devices in the wireless ad-hoc network 190. Specifically, the route table 105 holds the identifier of a communication device as the final transmission destination and the identifier of a communication device that relays a frame addressed to the transmission destination.

The access control list 107 includes a list of authentication information indicating whether or not authentication is possible about each authentication subject individually. With reference to the access control list 107, the communication controller 101 executes permission or rejection of authentication for the authentication subjects individually.

The synchronization button 109 is a user interface for addition of authentication information to the access control list 107. When this synchronization button 109 is pushed down, if a synchronization button of another communication device is also pushed down similarly, the authentication information of this another communication device is added to the access control list 107.

Figure 2A:
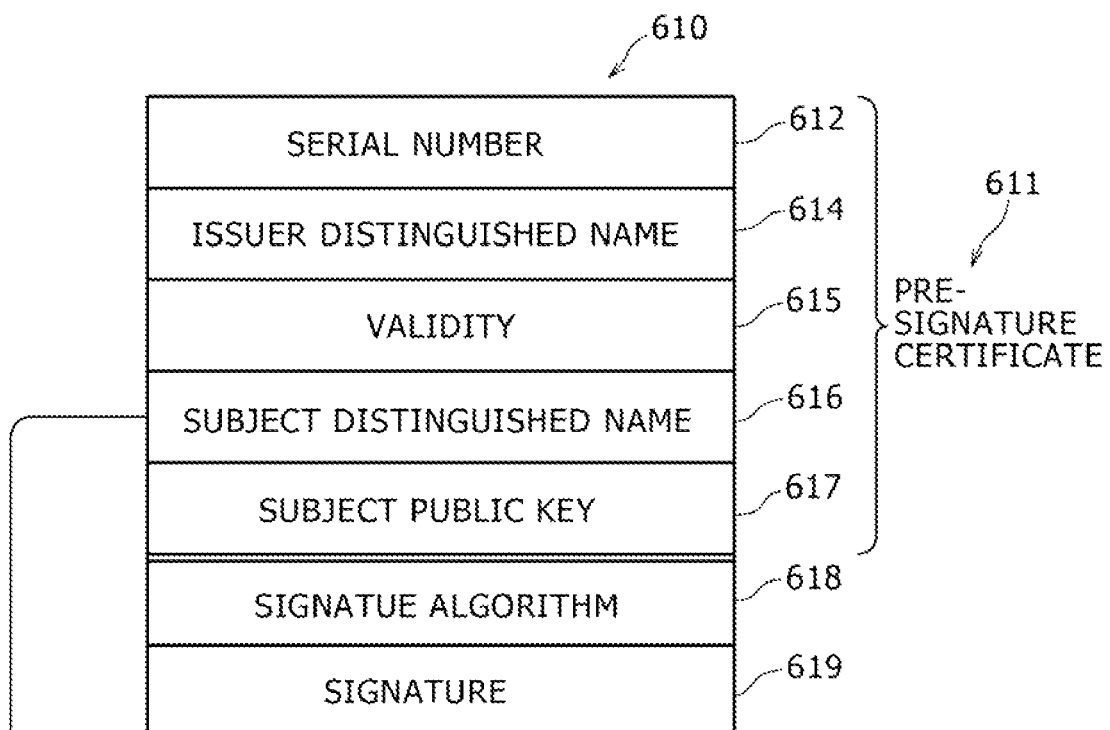
FIGS. 2A and 2B are diagrams showing the configuration of a public key certificate used in the first embodiment of the present invention.

FIG. 2 is a diagram showing the configuration of a public key certificate 610 used in the present embodiment. As shown in FIG. 2A, the public key certificate 610 is roughly classified into a pre-signature certificate 611, a signature algorithm 618, and a signature 619. The pre-signature certificate 611 includes a serial number 612, an issuer distinguished name 614, a validity 615, a subject distinguished name 616, and a subject public key 617.

The serial number 612 is the serial number of the public key certificate and is determined by a certification authority (CA). The issuer distinguished name 614 is identification information relating to the CA as the issuer of the public key certificate. The issuer distinguished name 614 and the serial number 612 allow the public key certificate to be uniquely identified. The validity 615 is the expiration date of the public key certificate. The subject distinguished name 616 is identification information relating to the owner of the public key certificate. The subject public key 617 is the public key of the owner indicated in the subject distinguished name 616.

The signature 619 is a signature made by the CA for the public key certificate, and the signature algorithm 618 is a signature algorithm used for this signature 619. The signature algorithm is composed of two algorithms: a message digest algorism and a public key encryption algorithm. The message digest algorism is one of hash functions, and is an algorithm for creating the message digest of the pre-signature certificate 611. The message digest is obtained by compressing input data (pre-signature certificate 611) to a fixed-length bit string, and is referred to also as a thumbprint, fingerprint, or the like. As the message digest algorithm, SHA-1 (Secure Hash Algorithm 1), MD2 (Message Digest #2), MD5 (MESSAGE Digest #5), and so on are known. The public key encryption algorithm is an algorithm for encrypting the message digest obtained based on the message digest algorithm by using the private key of the CA. As this public key encryption algorithm, the RSA based on the difficulty of the prime factorization problem, the DSA based on the difficulty of the discrete logarithm problem, and so on are known. The signature 619 arises from this encrypting of the message digest of the pre-signature certificate 611 by use of the private key of the CA.

Thus, the message digest is obtained by decrypting the signature 619 of this public key certificate by using the public key of the CA. A user of the public key certificate can verify that the content of the pre-signature certificate 611 is not altered, by creating the message digest of the pre-signature certificate 611 by oneself and comparing the created message digest with the message digest arising from the decryption by use of the public key of the CA.

Figure 2B:
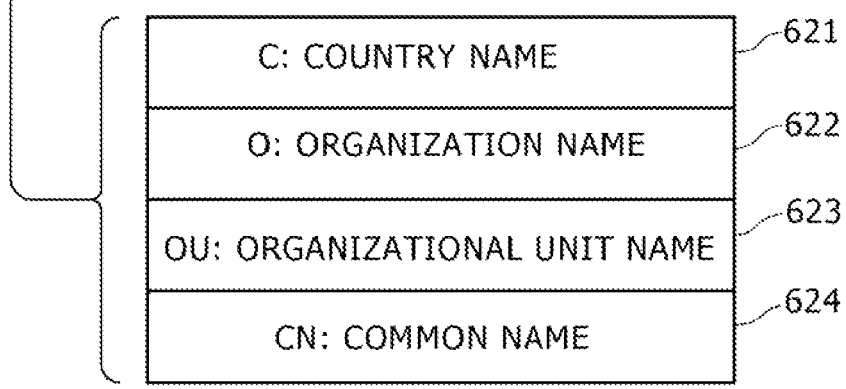

FIG. 2B is a diagram showing items of the identification information held as the subject distinguished name 616. In FIG. 2B, as one example, a country name (C) 621, an organization name (O) 622, an organizational unit name (OU) 623, and a common name (CN) 624 are shown.

The country name 621 represents the nationality of the owner. The organization name 622 represents the name of the organization to which the owner belongs. The organizational unit name 623 represents the name of the department in the organization to which the owner belongs. The common name 624 represents the common name of the owner. For example, as the common name 624, the device name of the communication device, uniform resource locator (URL) address, or the like is used.

FIG. 3 is a diagram showing one configuration example of the access control list 107 in the present embodiment. As items in the respective entries of the access control list 107, fields of identification information 712 and authentication possibility 713 are held in association with each other.

The identification information 712 is a field in which the identification information of the devices corresponding to the entries is held. In registration, all or part of factors in the subject distinguished name 616 included in the public key certificate 610 of the subject is held. In this example, the identification information 712 includes device names given to subject communication devices, such as "DSC-T9_002".

The authentication possibility 713 is a field that indicates whether authentication of the devices corresponding to the entries is possible, or whether the authentication should be rejected.

Although the authentication possibility 713 is held in association with the identification information 712 in this example, the configuration of the access control list 107 is not limited thereto. For example, without provision of the field of the authentication possibility 713, only the device names of communication devices of which authentication is possible may be held in the identification information 712, and the communication controller 101 may permit all authentication of the communication devices of which device name is held in the identification information 712.

The processing in the present embodiment is roughly classified into a first phase and a second phase. In the first phase, communication devices each register the identification information of the counterpart communication device in the access control list. In the second phase, the communication devices mutually authenticate each other by confirming whether the subject distinguished name of the public key certificate corresponds with an entry in the access control list.

For the registration of identification information in the first phase, the access control list 107 may be edited through direct input of the device name and the like of the communication device by an input device such as a keyboard. Alternatively, the counterpart communication device may be specified without use of such an input device. As a scheme for specifying the counterpart communication device, various schemes are available such as an in-band scheme, in which a wireless LAN interface as the original communication measure is used, and an out-of-band scheme, in which another network interface or external memory such as near-field communication (NFC), universal serial bus (USB) memory stick, or wired cable is used. The following description will deal with a realization example based on the in-band scheme employing synchronization buttons. The scheme described below is similar to a scheme disclosed in Japanese Patent Laid-open No. 2004-328093, and hence only the outline thereof will be described.

FIG. 4 is a diagram showing registration of the identification information of communication devices in a wireless communication system of the present embodiment. A communication device A 110 is supplied with "DSC-T9_001" as its device name, and a communication device B 120 is supplied with "DSC-T9_002" as its device name. Furthermore, the communication devices A 110 and B 120 are provided with synchronization buttons 119 and 129, respectively.

For the respective communication devices, a public key certificate in the X.509 format is issued from a specific certification authority (CA) and provided. To verify the validity of each other's public key certificate, the communication devices have also a server public key certificate of the certification authority (CA) that has issued the public key certificates, and a public key certificate of a higher-rank certification authority, necessary for chain authentication of the server public key certificate.

In the initial state of FIG. 4A, neither communication device is registered in the respective access control lists 117 and 127. When as shown in FIG. 4B, the synchronization buttons 119 and 129 are pushed down in the state in which the communication devices A 110 and B 120 are brought within a certain distance from each other, each other's device names are held in the access control lists 117 and 127 as shown in FIG. 4C. Specifically, the device name "DSC-T9_002" of the communication device B 120 is held in the access control list 117 of the communication device A 110, and the device name "DSC-T9_001" of the communication device A 110 is held in the access control list 127 of the communication device B 120.

FIG. 5 is a diagram showing a procedure example of registration of the identification information of communication devices in a wireless communication system of the present embodiment. In this example, the synchronization button 119 of the communication device A 110 is pushed down during the period from time T1 to T2. In response to this operation, the time T (=T2−T1) and the device name (="DSC-T9_001") of the communication device A 110 are transmitted to the communication device B 120. The time when the communication device B 120 receives this transmitted information is defined as S3.

On the other hand, the synchronization button 129 of the communication device B 120 is pushed down during the period from time S1 to S2. In response to this operation, the time S (=S2−S1) and the device name (="DSC-T9_002") of the communication device B 120 are transmitted to the communication device A 110. The time when the communication device A 110 receives this transmitted information is defined as T3.

If the relationships "|T3−T2|<C2" and "|T−S|<C1" are satisfied, the communication device A 110 permits authentication of the communication device B 120 (311), and adds the device name of the communication device B 120 to the access control list 117 (312). Specifically, if the communication device A 110 receives the information on the pushing-down of the synchronization button 129 from the communication device B 120 within the predetermined period C2 from the release of the synchronization button 119, and the difference in the pushing-down period falls within the predetermined length C1, the communication device A 110 determines that both the synchronization buttons have been pushed down at substantially the same timing.

Similarly, if the relationships "|S3−S2|<C2" and "|T−S|<C1" are satisfied, the communication device B 120 permits authentication of the communication device A 110 (321), and adds the device name of the communication device A 110 to the access control list 127 (322).

Although simultaneous pushing-down of the buttons is employed as the condition of registration of device names in this example, the registration condition is not limited thereto. For example, by using an electric wave intensity determiner, the status in which the electric wave intensity determiner has determined that the intensity of electric waves for authentication request from one communication device is equal to or higher than a threshold value may be employed as the registration condition. Alternatively, by using an electronic compass for measuring the absolute orientation, the statue in which the electronic compass has determined that the communication device is toward a predetermined orientation (e.g., in the state of being opposed to the counterpart communication device) may be employed as the registration condition.

The mutual authentication of the second phase in the first embodiment of the present invention will be described below. The processing in this phase is partially different between in the IBSS wireless LAN system, of which standards have been already established, and the mesh wireless LAN system, of which standardization is being currently advanced in e.g. the IEEE 802.11s. Therefore, the description will be separately made for the processing in each of these networks.

(a) Processing in IBSS Wireless LAN System

FIG. 6 is a diagram showing a procedure example of mutual authentication between communication devices in an IBSS wireless LAN system in the first embodiment of the present invention. In the IBSS wireless LAN system defined in the IEEE 802.11i, when authentication processing of the IEEE 802.1X is realized by the EAP-TLS authentication, both the roles of a supplicant and an authenticator/authentication server are interchanged between communication devices for mutual authentication. Specifically, subsequently to the first authentication processing, authentication processing is executed again in such a way that the communication device that has served as an authenticator/authentication server in the first authentication processing functions as a supplicant and the communication device that has served as a supplicant in the first authentication processing functions as an authenticator/authentication server, so that the communication devices mutually authenticate each other.

More specifically, first an authentication sequence 510 is carried out in such a way that the communication device A 110 serves as a supplicant and the communication device B 120 serves as an authenticator/authentication server. Thereafter, an authentication sequence 530 is carried out in such a way that the communication device A 110 serves as an authenticator/authentication server and the communication device B 120 serves as a supplicant.

FIG. 7 is a diagram showing a procedure example of an authentication sequence (510) in an IBSS wireless LAN system in the first embodiment of the present invention. In this example, as described above, the communication device A 110 serves as a supplicant, and the communication device B 120 serves as an authenticator/authentication server.

Initially, the communication device B 120 having the role of an authenticator/authentication server requests the communication device A 110 having the role of a supplicant to send the identification information of the communication device A 110 based on a frame body of the IEEE 802.1X and the EAP protocol (511). In response to this request, the communication device A 110 sends back its identification information (MyID) to the communication device B 120 (512).

Upon confirming the identification information of the communication device A 110, the communication device B 120 notifies the communication device A 110 of the start of the encryption protocol based on the TLS (513). In response to this notification, the communication device A 110 transmits a TLS ClientHello message to the communication device B 120 (514). This ClientHello message includes a 28-byte random number (ClientHello.random) that will serve as the seed of a key in subsequent key exchange.

Upon confirming the ClientHello message from the communication device A 110, the communication device B 120 transmits a TLS ServerHello message to the communication device A 110 (515). This ServerHello message includes a 28-byte random number (ServerHello.random) that will serve as the seed of a key in subsequent key exchange.

Subsequently to the ServerHello message, the communication device B 120 transmits a TLS ServerCertificate message to the communication device A 110. This ServerCertificate message includes the public key certificate of the communication device B 120.

Subsequently to the ServerCertificate message, the communication device B 120 transmits a TLS ServerKeyExchange message to the communication device A 110. This ServerKeyExchange message is to transmit encryption information necessary for creation of a premaster key (premaster_secret) by the communication device A 110.

Subsequently to the ServerKeyExchange message, the communication device B 120 transmits a TLS CertificateRequest message to the communication device A 110. The CertificateRequest message is to request the communication device A 110 to send the public key certificate.

Subsequently to the CertificateRequest message, the communication device B 120 transmits a ServerHelloDone message to the communication device A 110. This ServerHelloDone message is to notify the communication device A 110 of the end of the ServerHello message and messages relating thereto.

Thereafter, the communication devices A 110 and B 120 each create a master key based on the random numbers exchanged as described above and the premaster key (521).

Subsequently, the communication device A 110 transmits a TLS ClientCertificate message to the communication device B 120 (516). This ClientCertificate message includes the public key certificate of the communication device A 110.

Subsequently to the ClientCertificate message, the communication device A 110 transmits a TLS ClientKeyExchange message to the communication device B 120. This ClientKeyExchange message is to set the premaster key.

Subsequently to the ClientKeyExchange message, the communication device A 110 transmits a TLS CertificateVerify message to the communication device B 120. This CertificateVerify message is to verify the public key certificate of the communication device A 110.

Subsequently to the CertificateVerify message, the communication device A 110 transmits a TLS ChangeCipherSpec message to the communication device B 120. This ChangeCipherSpec message is to notify the communication device B 120 of use of a new encryption strategy and new cipher key for transmission of subsequent data.

Subsequently to the ChangeCipherSpec message, the communication device A 110 transmits a TLS Finished message to the communication device B 120. This Finished message is to notify the communication device B 120 of the success of the key exchange and authentication processing.

In response to the Finished message from the communication device A 110, the communication device B 120 transmits a TLS ChangeCipherSpec message to the communication device A 110 (517). Subsequently, the communication device B 120 transmits a TLS Finished message to the communication device A 110. In response to this transmission, the communication device A 110 sends back a response of the EAP protocol (518).

Thereafter, the communication devices A 110 and B 120 each create a pairwise master key (PMK) based on the random numbers exchanged as described above and the master key (522). Subsequently, information indicating the success of the EAP protocol is transmitted from the communication device B 120 to the communication device A 110 (519), so that the EAP-TLS authentication is ended.

Subsequently, as processing defined in the IEEE 802.11i, 4-Way handshake is performed (523). This 4-Way handshake is processing of creating a key necessary as the IEEE 802.11i based on the PMK created through the EAP-TLS authentication. This 4-Way handshake is initiated by the communication device B 120.

The authentication sequence of FIG. 7 corresponds to the authentication sequence 510 of FIG. 6. After the end of the authentication sequence of FIG. 7, the similar authentication sequence 530 is executed with the roles interchanged between the communication devices A 110 and B 120.

Figure 8:
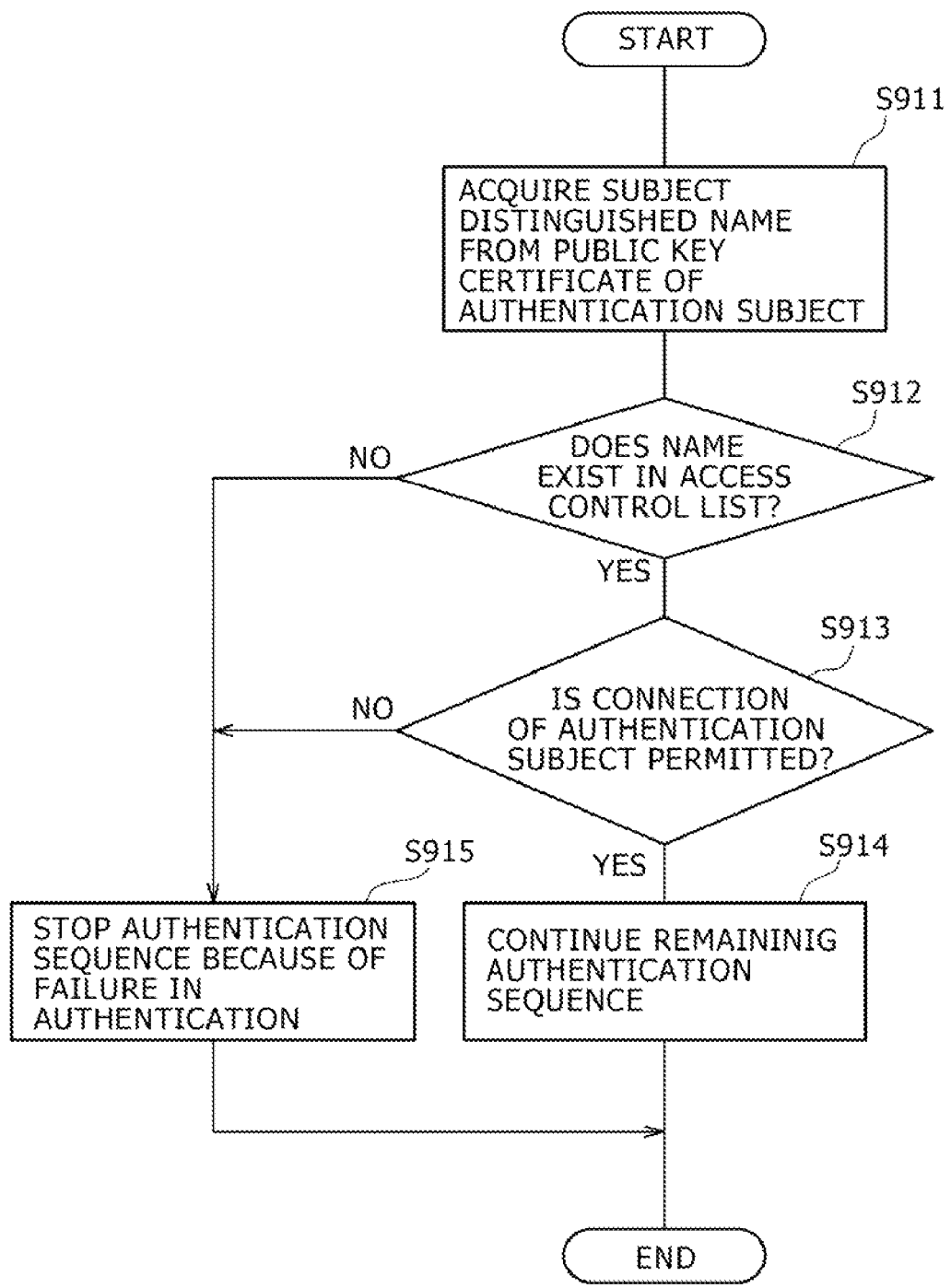
FIG. 8 is a diagram showing a procedure example of processing at the time of reception of a public key certificate in the first embodiment of the present invention.

FIG. 8 is a diagram showing a procedure example of processing at the time of reception of a public key certificate in the first embodiment of the present invention. This processing is executed when in the authentication sequence of FIG. 7, the communication device A 110 receives a public key certificate from the communication device B 120 via a ServerCertificate message (515), or when the communication device B 120 receives a public key certificate from the communication device A 110 via a ClientCertificate message (516).

Initially, the communication controller 101 acquires the subject distinguished name 616 from the public key certificate of an authentication subject (step S911). If the entry corresponding with the subject distinguished name 616 exists in the identification information 712 of the access control list 107 (step S912), whether or not authentication of the authentication subject is possible is determined based on the authentication possibility 713 of the authentication subject (step S913). If authentication of the authentication subject is possible, the remaining authentication sequence is continued (step S914).

On the other hand, if the entry corresponding with the subject distinguished name 616 does not exist in the identification information 712 of the access control list 107 (step S912), or if, although the entry exists, the authentication possibility 713 indicates that authentication of the authentication subject is not possible (step S913), the authentication sequence is stopped based on a determination that the authentication has failed (step S915).

(b) Processing in Mesh Wireless LAN System

Figure 9:
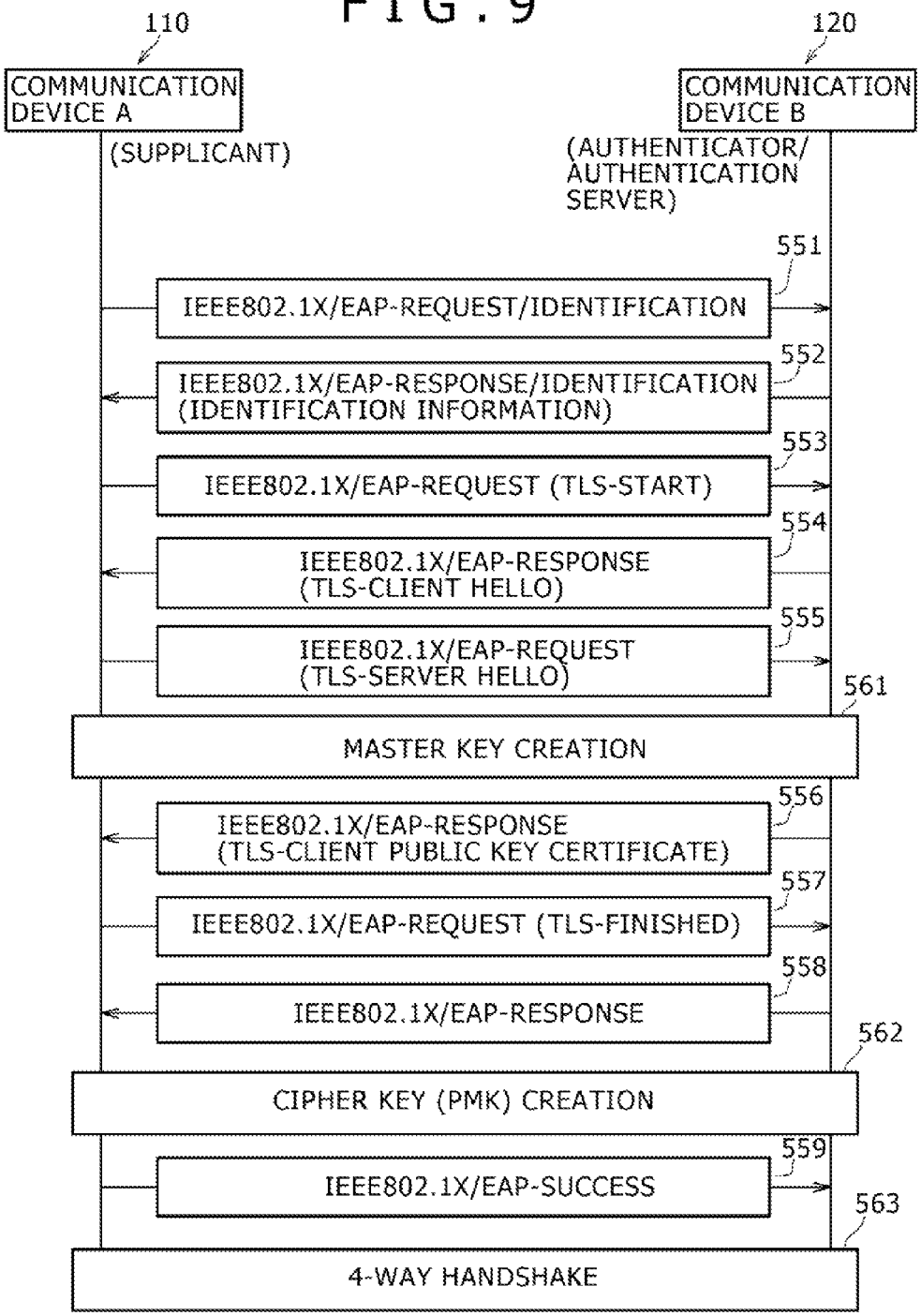
FIG. 9 is a diagram showing a procedure example of mutual authentication between communication devices in a mesh wireless LAN system in the first embodiment of the present invention.

FIG. 9 is a diagram showing a procedure example of mutual authentication between communication devices in a mesh wireless LAN system in the first embodiment of the present invention. In the mesh wireless LAN system proposed in the IEEE 802.11s, of which standardization is currently being advanced, when authentication processing of the IEEE 802.1X is realized by the EAP-TLS authentication, the processing is based on an assumption that negotiation about the roles of a supplicant and authenticator is performed in the scan phase executed prior to actual authentication processing and thus the roles are determined before the authentication processing. Therefore, there is no need to execute two times of authentication processing with interchange of the roles of a supplicant and authenticator/authentication server unlike in an IBSS wireless LAN system.

In this authentication sequence of FIG. 9, the data transmission directions are opposite to those in the authentication sequence of FIG. 7. Specifically, the communication device A 110 having the role of a supplicant requests the communication device B 120 having the role of an authenticator/authentication server to send the identification information of the communication device B 120 based on a frame body of the IEEE 802.1X and the EAP protocol (551), which starts the authentication sequence. Also in the subsequent steps, all the data transmission directions are opposite.

Also in this case, processing similar to that of FIG. 8 is executed both in (i) the communication device A 110 serving as a supplicant and in (ii) the communication device B 120 serving as both an authenticator and an authentication server. In the supplicant terminal (communication device A 110), the processing of FIG. 8 is executed at the timing when data is received in a step 555 of FIG. 9. In the authenticator/authentication server terminal (communication device B 120), the processing of FIG. 8 is executed at the timing when data is received in a step 556 of FIG. 9.

As described above, in the first embodiment of the present invention, each communication device holds the identification information of authentication subjects in its access control list 107, and compares the held information with a subject distinguished name in a public key certificate exchanged in mutual authentication. Thus, it is possible to individually determine whether or not to permit authentication about each communication device.

(1-1) Modification Example of First Embodiment

A modification example of the first embodiment of the present invention will be described below.

Figure 10:
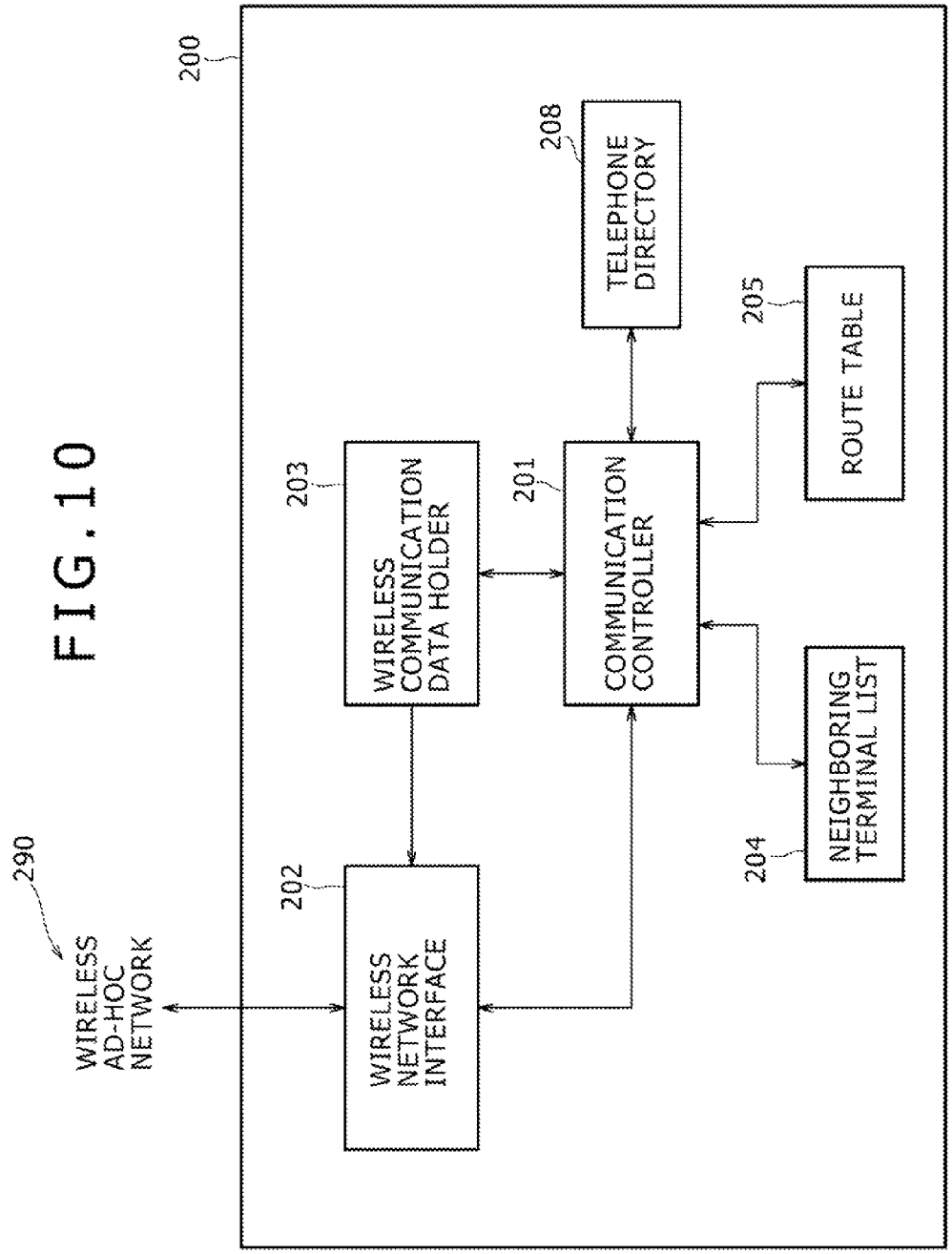
FIG. 10 is a diagram showing one configuration example of a mobile phone terminal as a modification example of the communication device in the first embodiment of the present invention.

FIG. 10 is a diagram showing one configuration example of a mobile phone terminal 200 as a modification example of the communication device in the first embodiment of the present invention. This mobile phone terminal 200 includes a communication controller 201, a wireless network interface 202, a wireless communication data holder 203, a neighboring terminal list 204, a route table 205, and a telephone directory 208. The mobile phone terminal 200 communicates with another communication device (mobile phone terminal) via a wireless ad-hoc network 290.

This mobile phone terminal 200 realizes voice over wireless LAN (VoWLAN) because it includes the wireless network interface 202. Specifically, via the wireless ad-hoc network 290, the mobile phone terminal 200 can connect to a fixed-line phone, IP phone, or the like and allows a call with it. Furthermore, the mobile phone terminal 200 can be used as a normal mobile phone outside. Such combination between a mobile phone and fixed-line phone is referred to as fixed mobile convergence (FMC).

In the mobile phone terminal 200, the communication controller 201, the wireless network interface 202, the wireless communication data holder 203, the neighboring terminal list 204, and the route table 205 have the same functions as those of the equivalents in the communication device 100 of FIG. 1.

The telephone directory 208 is a list of telephone numbers used for a telephone call. In this modification example, identification information is not expressly registered in advance in the access control list 107 unlike the example of FIG. 1, but the telephone directory 208 is used as the access control list 107. Thus, by utilizing the telephone directory in which telephone numbers have been accumulated without explicit registration of identification information, preparation for mutual authentication is simplified. Specifically, the telephone number of the owner is held in the common name 624 of the subject distinguished name 616 of a public key certificate. This makes it possible to search the telephone directory 208 for a telephone number (common name 624) included in a public key certificate exchanged in mutual authentication.

To registration of the telephone number of a target mobile phone terminal in the telephone directory of a mobile phone, a normal use mode can be applied. For example, a mobile phone user may orally ask about a target telephone number and store it through dial input. Furthermore, there is also a method in which a mobile phone number of a user is registered in a counterpart mobile phone terminal by making a call from the mobile phone terminal of the user to the counterpart mobile phone terminal.

FIG. 11 is a diagram showing one configuration example of the telephone directory 208 in the present modification example. As items in the respective entries of the telephone directory 208, fields of a name 821, a telephone number 822, and authentication possibility 823 are held in association with each other.

The name 821 represents the names of the persons corresponding to the entries. As the name 821, the combination of both a family name and first name may be used. Alternatively, either one may be used. More alternatively, a nickname may be used as long as the person can be specified.

The telephone number 822 represents the telephone numbers of the persons corresponding to the entries.

The authentication possibility 823 is a field that indicates whether authentication of the persons corresponding to the entries is possible, or whether the authentication should be rejected.

The registration is so made that authentication of an acquaintance registered in the telephone directory is permitted basically based on a premise that this acquaintance is a reliable person. However, it is possible to control whether or not to permit authentication by setting the authentication possibility 823 to "authentication is rejected" about a person for which permission of connection via the wireless network interface 202 is not desired.

Also in this modification example, the mutual authentication based on the EAP-TLS authentication is performed in accordance with the authentication sequence of FIG. 7 or 9. In the authentication sequence, when one communication device receives a public key certificate from the other communication device via a ServerCertificate message, or when one communication device receives a public key certificate from the other communication device via a ClientCertificate message, the public key certificate is checked similarly to the sequence of FIG. 8.

A public key certificate can be set at the time of shipping of a mobile phone terminal. The telephone number of the mobile phone terminal is held in the common name 624 in the subject distinguished name 616 of the public key certificate, which permits the public key certificate to be used to determine whether or not to permit authentication at the time of mutual authentication.

Figure 12:
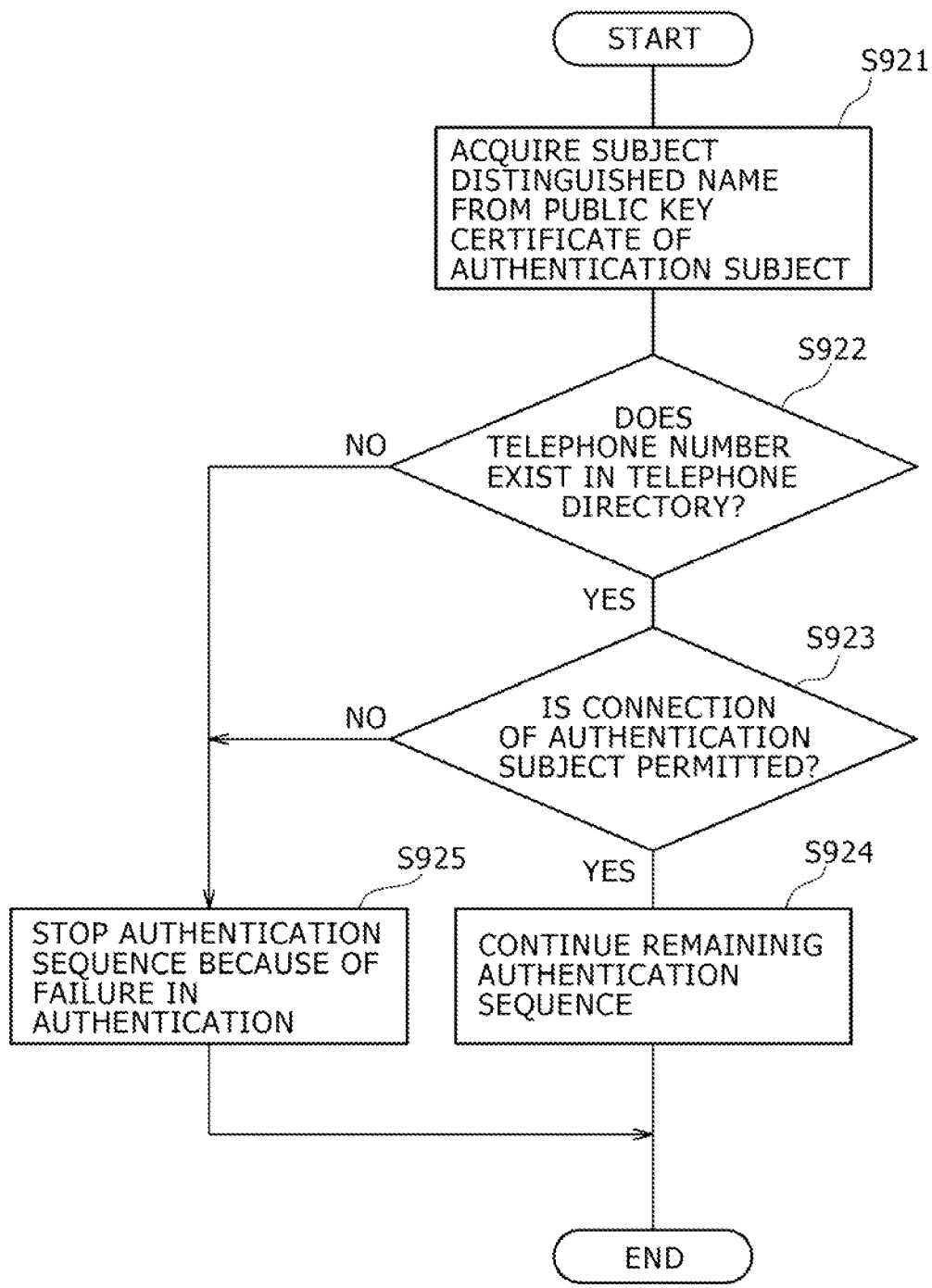
FIG. 12 is a diagram showing a procedure example of processing at the time of reception of a public key certificate in the modification example of the first embodiment of the present invention.

FIG. 12 is a diagram showing a procedure example of processing at the time of reception of a public key certificate in the present modification example.

Initially, the communication controller 201 acquires the subject distinguished name 616 from the public key certificate of an authentication subject (step S921). If the entry corresponding with the telephone number (common name 624) included in the subject distinguished name 616 exists in the telephone number 822 of the telephone directory 208 (step S922), whether or not authentication of the authentication subject is possible is determined based on the authentication possibility 823 of the authentication subject (step S923). If authentication of the authentication subject is possible, the remaining authentication sequence is continued (step S924).

On the other hand, if the entry corresponding with the telephone number included in the subject distinguished name 616 does not exist in the telephone number 822 of the telephone directory 208 (step S922), or if, although the entry exists, the authentication possibility 823 indicates that authentication of the authentication subject is not possible (step S923), the authentication sequence is stopped based on a determination that the authentication has failed (step S925).

As described above, in the modification example of the first embodiment of the present invention, a telephone number included in a subject distinguished name of a public key certificate exchanged in mutual authentication is compared with telephone numbers included in the telephone directory 208 in a mobile number phone. This makes it possible to individually determine whether or not to permit authentication about each mobile phone terminal.

(2) Second Embodiment

A second embodiment of the present invention will be described below.

In the above-described first embodiment, the communication device A 110 (or the communication device B 120) stops the authentication sequence based on a determination that the authentication processing has failed, if either of the following situations occurs.

(Situation 1): identification information is not stored in the access control list 107 originally ("No" in the step S912 of FIG. 8).

(Situation 2): the status stored in the authentication possibility 713 of the access control list 107 indicates that "authentication is rejected" ("No" in the step S913 of FIG. 8).

These situations occur based on the information in the access control list 107. Originally, the purpose of the provision of this list 107 is to permit a user to communicate with only an entity that is selected as a correspondent by the user truly, to thereby prevent the leakage of individual information and so on. Therefore, when a user desires communication with a communication device of an authentication subject based on the determination by the user oneself, no problem would be caused even if the user continues the authentication sequence despite information stored in the access control list 107. To the contrary, the forcible stop of the authentication sequence in this case would possibly lead to even lowered convenience for the user.

To address this, the present embodiment is provided with an additional function. Specifically, due to this function, in the processing of FIG. 8, the intention of a user is checked before the forcible stop of the authentication sequence. If the user determines that the sequence stop is unnecessary, the function continues the authentication sequence.

However, if such a scheme is employed, there is a possibility that the EAP-TLS will time out during waiting for user's selection for e.g. a reason that the user fails to notice the information showing. Therefore, it is desirable to implement a solution to the occurrence of such a situation in advance. As a specific solution, any scheme may be used. For example, the authentication sequence may be forcibly stopped at the time of the occurrence of the time-out. The following description will deal with an example in which the authentication sequence shown in FIG. 7 is retried at the time of the occurrence of the time-out and the intention of a user is checked again.

Figure 13:
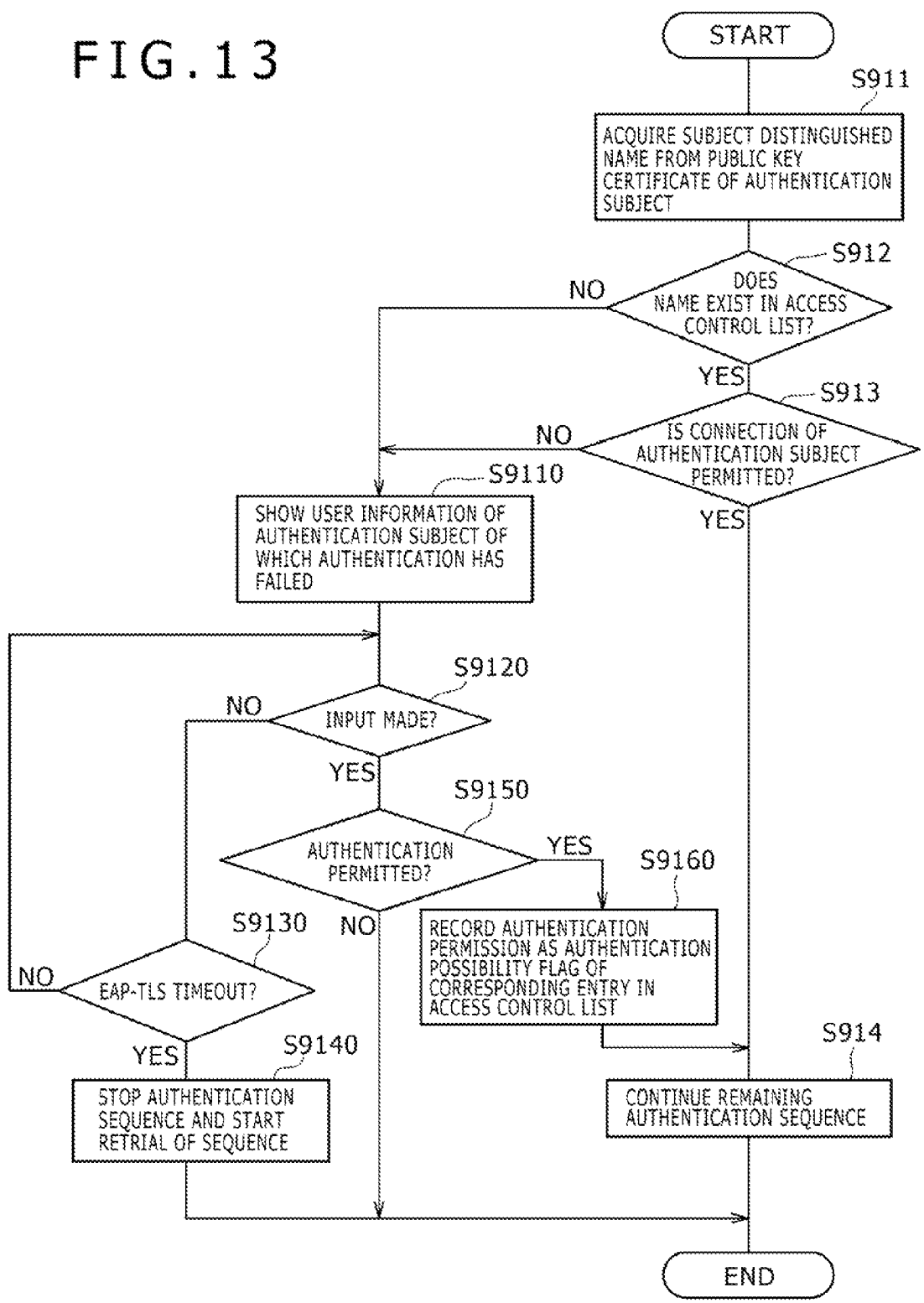
FIG. 13 is a diagram showing a procedure example of processing at the time of reception of a public key certificate in a second embodiment of the present invention.

FIG. 13 shows a procedure example of processing at the time of reception of a public key certificate, executed by a communication controller 101 in a communication device according to the present embodiment in order to realize the above-described function.

This processing is executed (a) in the step 515 or 516 in the authentication sequence of FIG. 7 in the case of an IBSS wireless LAN system, or (b) in the step 555 or 556 in the authentication sequence of FIG. 9 in the case of a mesh wireless LAN system. In FIG. 13, the same steps as those in FIG. 8 are given the same step numbers.

In the processing of FIG. 13, initially the communication controller 101 executes the processing of a step S911. If the entry corresponding with the subject distinguished name 616 acquired from the public key certificate of the authentication subject exists in the identification information 712 of the access control list 107 ("yes" in a step S912), and if the authentication possibility 713 indicates that authentication of this authentication subject is possible ("yes" in a step S913), the remaining authentication sequence is continued (step S914).

In contrast, if the above-described Situation 1 or 2 occurs (i.e., the determination "no" is made in the step S912 or S913), the communication controller 101 outputs information for causing the user to select whether or not to continue the authentication sequence (step S9110). Any method may be used as the method for showing this information. For example, information on the subject communication terminal may be displayed on a display unit (not shown) together with a text such as "authentication failed. Do you continue authentication?". Alternatively, audio may be output from a speaker (not shown). More alternatively, the information may be shown through lighting of a light-emitting diode or the like.

For a predetermined time after this information showing, the communication controller 101 is in the state of waiting for a user input ("no" in a step S9120 and "no" in a step S9130). When the EAP-TLS has timed out, the determination "yes" is made in the step S9130. As a result, the communication controller 101 stops the authentication sequence, and then executes processing for retrying the authentication sequence of FIG. 7 from its beginning (step S9140), followed by the end of the processing.

On the other hand, if the user has performed input operation in accordance with this information showing, the communication controller 101 makes the determination "yes" in the step S9120, and then determines whether or not this input operation is to permit authentication (step S9150). If the user input is to indicate that authentication is not permitted, the communication controller 101 makes the determination "no" in the step S9150, followed by the end of the processing. In contrast, if the user has performed input operation for indicating that authentication processing is permitted ("yes" in the step S9150), the communication controller 101 stores information (e.g., flag) indicating that "authentication is permitted" in the authentication possibility field 713 of the access control list 107 corresponding to the communication subject (step S9160), and then advances the processing to the step S914. As a result, the authentication sequence is continued in the system.

Figure 14:
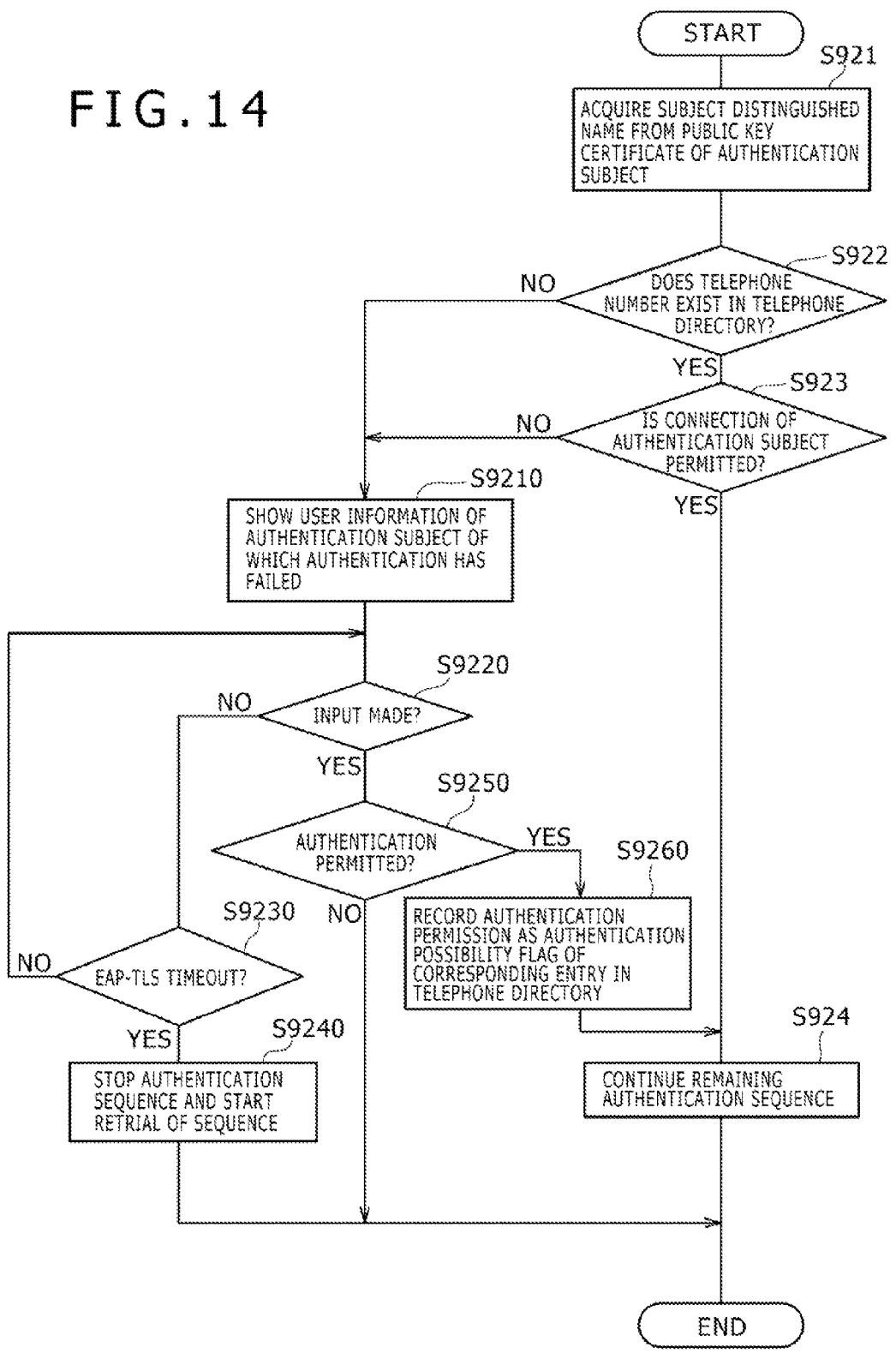
FIG. 14 is a diagram showing a procedure example of processing at the time of reception of a public key certificate in a modification example of the second embodiment of the present invention.

This scheme of asking a user for determination can be applied not only to the processing of FIG. 8 but also to the processing of FIG. 12 similarly. FIG. 14 shows a processing example when the scheme of asking a user for determination is applied to the processing of FIG. 12. In FIG. 14, the same steps as those in FIG. 12 are given the same numerals.

As shown in FIG. 14, in this processing example, if the determination "no" is made in either a step S922 or S923, a communication controller 201 shows a user information for checking the intension of the user similarly to the step S9110 of FIG. 13 (step S9210). Subsequently, for a predetermined time, the communication controller 201 waits for a user input ("no" in a step S9220 and "no" in a step S9230). At the timing when the EAP-TLS has timed out, the determination "yes" is made in the step S9230. As a result, the communication controller 201 stops the authentication sequence, and then executes processing for retrying the authentication sequence (step S9240), followed by the end of the processing.

In contrast, if the user has performed input operation, the communication controller 201 makes the determination "yes" in the step S9220, and then executes the processing of a step S9250. If the user has performed input operation to stop the authentication ("no" in the step S9250), the communication controller 201 finishes the authentication sequence. In contrast, if the user has performed input operation to permit the authentication ("yes" in the step S9250), the communication controller 201 stores information (e.g., flag) indicating that "authentication is permitted" in the authentication possibility field 713 in the telephone directory 208 corresponding to the communication subject (step S9260), and then advances the processing to a step S924. As a result, the authentication sequence is continued in the system.

As described above, in the second embodiment of the present invention, even when information stored in an access control list or telephone directory in a communication device indicates that there is no need to continue authentication processing, it is possible to continue the authentication sequence based on the intension of the user. Therefore, more user-friendly authentication processing can be realized.

The first and second embodiments of the present invention are merely an example for embodying the present invention. Elements in the embodiments have correspondence to invention-specifying items set forth in the claims as shown below. However, the present invention is not limited to the elements but may be modified variously without departing from the spirit and scope of the present invention.

Specifically, in claims 1 and 2, the identification information acquirer corresponds to e.g. the wireless network interface 102 or 202. Furthermore, the identification information holder corresponds to e.g. the access control list 107 or the telephone directory 208. In addition, the authentication unit corresponds to e.g. the communication controller 101 or 201.

In claim 3, the public key certificate corresponds to e.g. the public key certificate 610 in the X.509 format.

In claim 4, a telephone number held in the identification information holder corresponds to e.g. the telephone number 822.

In claims 5 and 6, the step of acquiring identification information corresponds to e.g. the procedure 311 or 321. Furthermore, the step of holding identification information corresponds to e.g. the procedure 312 or 322. In addition, the step of continuing authentication corresponds to e.g. the steps S911 to S915 or S921 to S925.

The processing procedures described in the first and second embodiments of the present invention may be treated as a method including the series of the procedure. Furthermore, the processing procedures may be treated also as a program for causing a computer to execute the series of the procedure, or a recording medium in which the program is stored.

It should be understood that the present invention is not limited to the embodiments described heretofore, but also encompasses those changes falling within the spirit and scope of the appended claims.

What is claimed is:

1. A wireless communication system in which a plurality of wireless communication devices form a network in an autonomous distributed manner, each of the plurality of wireless communication devices comprising:
   a synchronization button;
   an identification information acquirer configured to acquire, from another wireless communication device when the synchronization button and another synchronization button of the another wireless communication device are pushed down at substantially the same timing, identification information of the another communication device;
   an identification information holder configured to hold the acquired identification information of the another wireless communication device;
   an authentication unit configured to, in authentication of the another wireless communication device, continue the authentication on condition that identification information in a certificate of the another wireless communication device is held in the identification information holder;
   a neighboring terminal list configured to store a list of wireless communication devices that exist nearby; and
   a route table holding an identifier of a destination communication device and an identifier of a relaying communication device, the relaying communication device relaying a frame addressed to the destination communication device,
   wherein:
      the identification information holder holds information relating to possibility of authentication of the another wireless communication device as authentication possibility information in such a manner as to associate the authentication possibility information with the acquired identification information of the another wireless communication device,
      in the authentication of the another wireless communication device, the authentication unit continues the authentication on condition that the identification information in the certificate of the another wireless communication device corresponds with the identification information held in the identification information holder and the authentication possibility information indicates that authentication is possible, and
      even if the authentication possibility information indicates that authentication is not permitted, the authentication unit continues the authentication, if a user has made an input instructing the authentication unit to continue the authentication after the user is shown information for prompting the user to determine whether or not to permit continuation of the authentication.

2. A wireless communication device in a wireless communication system in which a plurality of wireless communication devices form a network in an autonomous distributed manner, the device comprising:
   a synchronization button;
   an identification information acquirer configured to acquire, from another wireless communication device when the synchronization button and another synchronization button of the another wireless communication device are pushed down at substantially the same timing, identification information of the another communication device;
   an identification information holder configured to hold the acquired identification information of the another wireless communication device;
   an authentication unit configured to, in authentication of the another wireless communication device, continue the authentication on condition that identification information in a certificate of the another wireless communication device is held in the identification information holder;
   a neighboring terminal list configured to store a list of wireless communication devices that exist nearby; and
   a route table holding an identifier of a destination communication device and an identifier of a relaying communication device, the relaying communication device relaying a frame addressed to the destination communication device,
   wherein:
      the identification information holder holds information relating to possibility of authentication of the another wireless communication device as authentication possibility information in such a manner as to associate the authentication possibility information with the acquired identification information of the another wireless communication device, in the authentication of the another wireless communication device, the authentication unit continues the authentication on condition that the identification information in the certificate of the another wireless communication device corresponds with the identification information held in the identification information holder and the authentication possibility information indicates that authentication is possible, and even if the authentication possibility information indicates that authentication is not permitted, the authentication unit continues the authentication, if a user has made an input instructing the authentication unit to continue the authentication after the user is shown information for prompting the user to determine whether or not to permit continuation of the authentication.

3. The wireless communication device according to claim 2, wherein the certificate of the another wireless communication device is a public key certificate of the another wireless communication device, and the identification information in the certificate is identification information of an owner of the public key certificate.

4. The wireless communication device according to claim 2, wherein the identification information of the another communication device held in the identification information holder includes a telephone number of the another communication device, and the identification information in the certificate includes the telephone number of the another communication device.

5. An authentication method of a wireless communication device including an identification information holder that holds identification information of another wireless communication device in a wireless communication system in which a plurality of wireless communication devices form a network in an autonomous distributed manner, the method comprising the steps of:

acquiring, from another wireless communication device when a synchronization button of the wireless communication device and another synchronization button of the another wireless communication device are pushed down at substantially the same timing, identification information of the another communication device;

holding the acquired identification information of the another wireless communication device in the identification information holder;

in authentication of the another wireless communication device, continuing the authentication on condition that identification information in a certificate of the another wireless communication device is held in the identification information holder;

recording and updating a list of wireless communication devices that exist nearby in a neighboring terminal list; and recording and updating, in a route table, an identifier of a destination communication device or an identifier of a relaying communication device, the relaying communication device relaying a frame addressed to the destination communication device, wherein:

the identification information holder holds information relating to possibility of authentication of the another wireless communication device as authentication possibility information in such a manner as to associate the authentication possibility information with the acquired identification information of the another wireless communication device, in the authentication of the another wireless communication device, the authentication unit continues the authentication on condition that the identification information in the certificate of the another wireless communication device corresponds with the identification information held in the identification information holder and the authentication possibility information indicates that authentication is possible, and even if the authentication possibility information indicates that authentication is not permitted, the authentication unit continues the authentication, if a user has made an input instructing the authentication unit to continue the authentication after the user is shown information for prompting the user to determine whether or not to permit continuation of the authentication.

6. A computer-readable non-transitory medium encoded with a program that operates on a wireless communication device including an identification information holder that holds identification information of another wireless communication device in a wireless communication system in which a plurality of wireless communication devices form a network in an autonomous distributed manner, the program causing a computer to execute the steps of:

acquiring, from another wireless communication device when a synchronization button of the wireless communication device and another synchronization button of the another wireless communication device are pushed down at substantially the same timing, identification information of the another communication device;

holding the acquired identification information of the another wireless communication device in the identification information holder;

in authentication of the another wireless communication device, continuing the authentication on condition that identification information in a certificate of the another wireless communication device is held in the identification information holder;

recording and updating a list of wireless communication devices that exist nearby in a neighboring terminal list; and recording and updating, in a route table, an identifier of a destination communication device or an identifier of a relaying communication device, the relaying communication device relaying a frame addressed to the destination communication device, wherein:

the identification information holder holds information relating to possibility of authentication of the another wireless communication device as authentication possibility information in such a manner as to associate the authentication possibility information with the acquired identification information of the another wireless communication device, in the authentication of the another wireless communication device, the authentication unit continues the authentication on condition that the identification information in the certificate of the another wireless communication device corresponds with the identification information held in the identification information holder and the authentication possibility information indicates that authentication is possible, and even if the authentication possibility information indicates that authentication is not permitted, the authentication unit continues the authentication, if a user has made an input instructing the authentication unit to continue the authentication after the user is shown information for prompting the user to determine whether or not to permit continuation of the authentication.

* * * * *